(12) United States Patent
Ochiai et al.

(10) Patent No.: US 10,477,131 B2
(45) Date of Patent: Nov. 12, 2019

(54) IMAGING DEVICE, IMAGING SYSTEM, AND MOBILE OBJECT

(71) Applicant: CANON KABUSHIKI KAISHA, Tokyo (JP)

(72) Inventors: Kei Ochiai, Inagi (JP); Hideo Kobayashi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/462,624

(22) Filed: Mar. 17, 2017

(65) Prior Publication Data
US 2017/0289480 A1 Oct. 5, 2017

(30) Foreign Application Priority Data
Mar. 31, 2016 (JP) .................. 2016-072990

(51) Int. Cl.
*H04N 5/3745* (2011.01)
*H04N 5/378* (2011.01)
*H04N 9/04* (2006.01)
*H04N 5/369* (2011.01)
*H04N 5/232* (2006.01)
*G06T 7/73* (2017.01)
*G05B 15/02* (2006.01)

(52) U.S. Cl.
CPC ......... *H04N 5/37452* (2013.01); *G05B 15/02* (2013.01); *G06T 7/74* (2017.01); *H04N 5/23245* (2013.01); *H04N 5/3696* (2013.01); *H04N 5/378* (2013.01); *H04N 5/37457* (2013.01); *H04N 9/045* (2013.01)

(58) Field of Classification Search
CPC .... H04N 5/378; H04N 9/045; H04N 5/37457; H04N 5/37452; H04N 5/23245; H04N 5/3696; G05B 15/02; G06T 7/74
See application file for complete search history.

(56) References Cited

U.S. PATENT DOCUMENTS

| 7,800,673 | B2* | 9/2010 | Sugawa | ............ H01L 27/14609 348/308 |
| 2006/0208161 | A1* | 9/2006 | Okita | ................ H01L 27/14603 250/208.1 |

(Continued)

FOREIGN PATENT DOCUMENTS

JP 2010-193437 A 9/2010

*Primary Examiner* — Albert H Cutler
(74) *Attorney, Agent, or Firm* — Canon USA, Inc., IP Division

(57) ABSTRACT

A photoelectric conversion device includes a plurality of pixels. Each pixel includes an amplification transistor that has an input node configured to receive electric charge generated through photoelectric conversion, a reset transistor, and a capacitance control unit. In a state where the reset transistor is off, the capacitance control unit switches a capacitance of the input node from a first capacitance value to a second capacitance value, which is greater than the first capacitance value. Subsequently, the reset transistor is controlled from off to on in a state where the capacitance of the input node has been controlled to the second capacitance value. After the reset operation, the amplification transistor outputs a pixel signal in a state where the capacitance of the input node is the first capacitance value.

19 Claims, 10 Drawing Sheets

(56) References Cited

U.S. PATENT DOCUMENTS

| | | | |
|---|---|---|---|
| 2012/0132787 A1* | 5/2012 | Mabuchi | H04N 5/363 250/208.1 |
| 2013/0001403 A1* | 1/2013 | Yamakawa | H01L 27/14609 250/208.1 |
| 2013/0063640 A1* | 3/2013 | Sugiyama | H04N 5/3742 348/302 |
| 2013/0161485 A1* | 6/2013 | Oh | H01L 27/14612 250/208.1 |
| 2015/0189145 A1* | 7/2015 | Lee | H04N 5/35536 348/308 |
| 2015/0333099 A1* | 11/2015 | Lyu | H01L 27/14647 257/432 |
| 2017/0171470 A1* | 6/2017 | Sakioka | H01L 27/14627 |

* cited by examiner

IMAGING DEVICE, IMAGING SYSTEM, AND MOBILE OBJECT

BACKGROUND OF THE INVENTION

Field of the Invention

The aspect of the embodiments relates to an imaging device, an imaging system, and a mobile object.

Description of the Related Art

An imaging device discussed in Japanese Patent Application Laid-Open No. 2010-193437 includes a plurality of pixels. Each pixel includes a floating diffusion region (hereinafter, referred to as "FD region") that can hold electric charge generated through photoelectric conversion and an amplification portion that can amplify the electric charge voltage converted by the FD region and output the amplified voltage.

The imaging device discussed in Japanese Patent Application Laid-Open No. 2010-193437 further includes an FD connection transistor that can control connection and disconnection between a plurality of FD regions included in different pixels. Compared to a capacitance value of each FD region, a capacitance value of a node constituted by a plurality of mutually connected FD regions is larger. More specifically, it is feasible to change a capacitance value of the FD region when the FD connection transistor connects the plurality of FD regions to each other. An electric charge voltage conversion coefficient in the FD region is determined based on the capacitance value of the FD region. Therefore, the imaging device discussed Japanese Patent Application Laid-Open No. 2010-193437 can change a gain in an image-capturing operation according to ON and OFF of the FD connection transistor.

SUMMARY OF THE INVENTION

According to an aspect of the embodiments, an imaging device having a plurality of pixel units, each of the plurality of pixel units including an output portion including an input node to receive electric charge generated through photoelectric conversion and being configured to output a signal based on a voltage of the input node, a reset portion controlled to turn on or off and configured to reset a voltage of the input node in an on state, and a control portion including a gate electrode configured to receive a control signal and being configured to control a capacitance of the input node to a first capacitance value and a second capacitance value, which is greater than the first capacitance value, according to the control signal, wherein the imaging device is operable in a first mode for causing the output portion to output the signal in a state where the capacitance of the input node is the first capacitance value, and a second mode for causing the output portion to output the signal in a state where the capacitance of the input node is the second capacitance value, wherein, in the first mode, a reset operation is performed to cause the control portion to switch the capacitance of the input node from the first capacitance value to the second capacitance value in a state where the reset portion is off and subsequently controlling the reset portion from off to on in the state where the capacitance of the input node is the second capacitance value, and after completing the reset operation, an output operation is performed to cause the control portion to switch the capacitance of the input node from the second capacitance value to the first capacitance value and causing the output portion to output the signal in the state where the capacitance of the input node is the first capacitance value.

Further features of the disclosure will become apparent from the following description of exemplary embodiments with reference to the attached drawings.

DESCRIPTION OF THE EMBODIMENTS

Imaging devices according to some exemplary embodiments can reduce noises.

Figure 3:
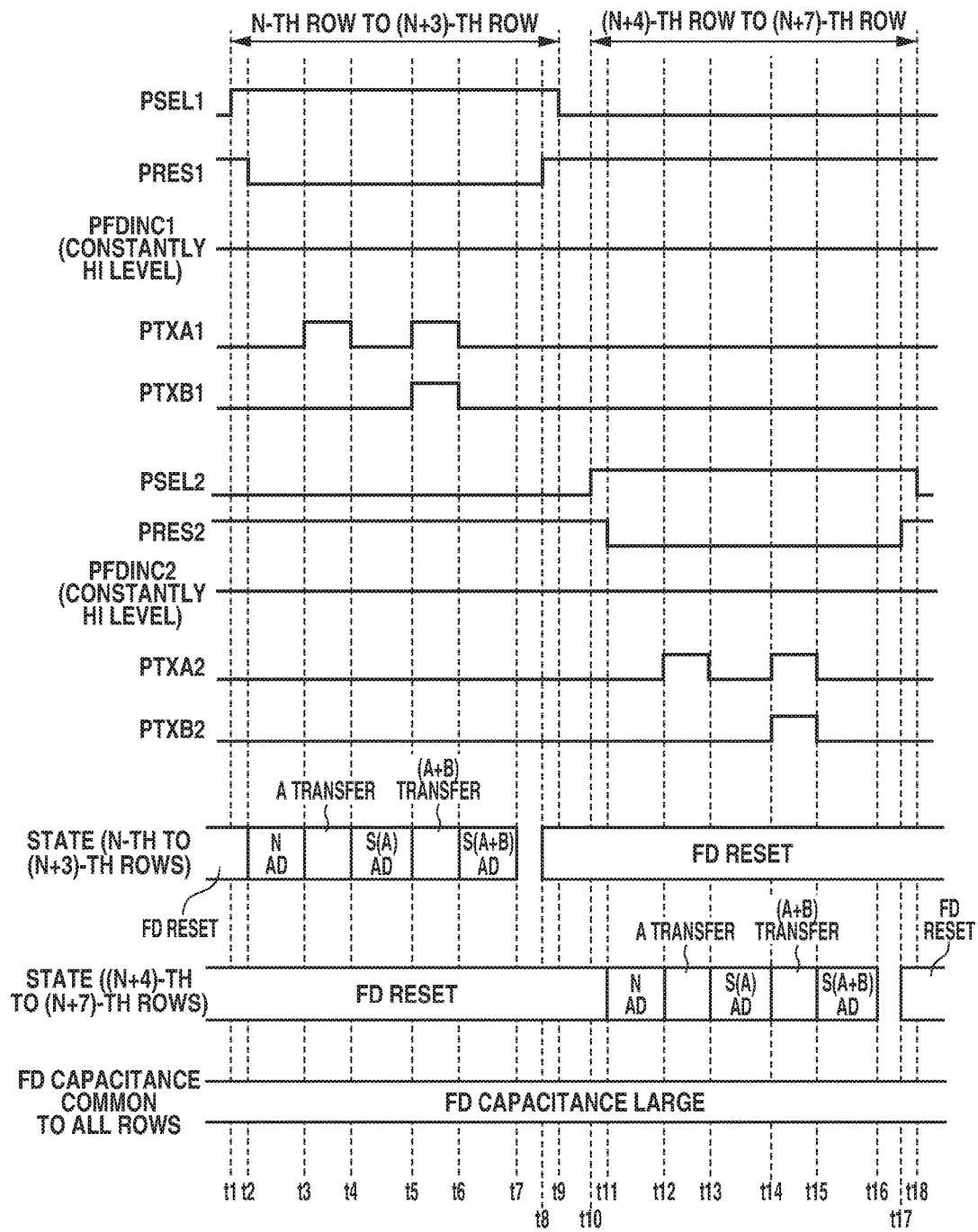
FIG. 3 is a timing chart illustrating control signals used to drive the imaging device.

In general, the imaging device resets the voltage of an FD region before outputting a signal from a pixel in the operation of the imaging device. The imaging device turns on a reset transistor to perform the reset operation for resetting the voltage of the FD region. The imaging device discussed in Japanese Patent Application Laid-Open No. 2010-193437 has a mode for outputting a signal in an OFF state of the FD connection transistor, as illustrated in FIG. 3 of Japanese Patent Application Laid-Open No. 2010-193437. When the imaging device resets the voltage of the FD region in this mode, the imaging device turns on the FD connection transistor.

However, Japanese Patent Application Laid-Open No. 2010-193437 does not include any explicit discussion about a relationship between ON timing of the reset transistor and ON timing of the FD connection transistor. The inventors of the present application have found a possibility of causing noises if the relationship between the reset transistor ON timing and the FD connection transistor ON timing is inappropriate.

For example, if the reset transistor and the FD connection transistor turn on simultaneously, the voltage of the FD region greatly changes due to a coupling between the gate terminal of each transistor and an FD capacitance. If the voltage of the FD region greatly changes according to the operation of the transistor, there will be a possibility of failing in accurately resetting the voltage of the FD region. As a result, it becomes difficult to output an accurate signal.

Further, a reset operation to be performed in a mode in which a signal is output in a state where a plurality of FD regions is mutually connected may be different from a reset operation to be performed in an image capturing mode in which a signal is used in a state where a plurality of FD regions is not connected. In this case, the magnitude of voltage variation in the FD region during the reset operation is possibly different. As a result, there will be a possibility of causing noises such as shading.

The FD connection transistor discussed in Japanese Patent Application Laid-Open No. 2010-193437 changes the capacitance of the FD region. However, the above-mentioned noise problem can arise similarly in another configuration that changes the capacitance of the FD region.

Figure 1:
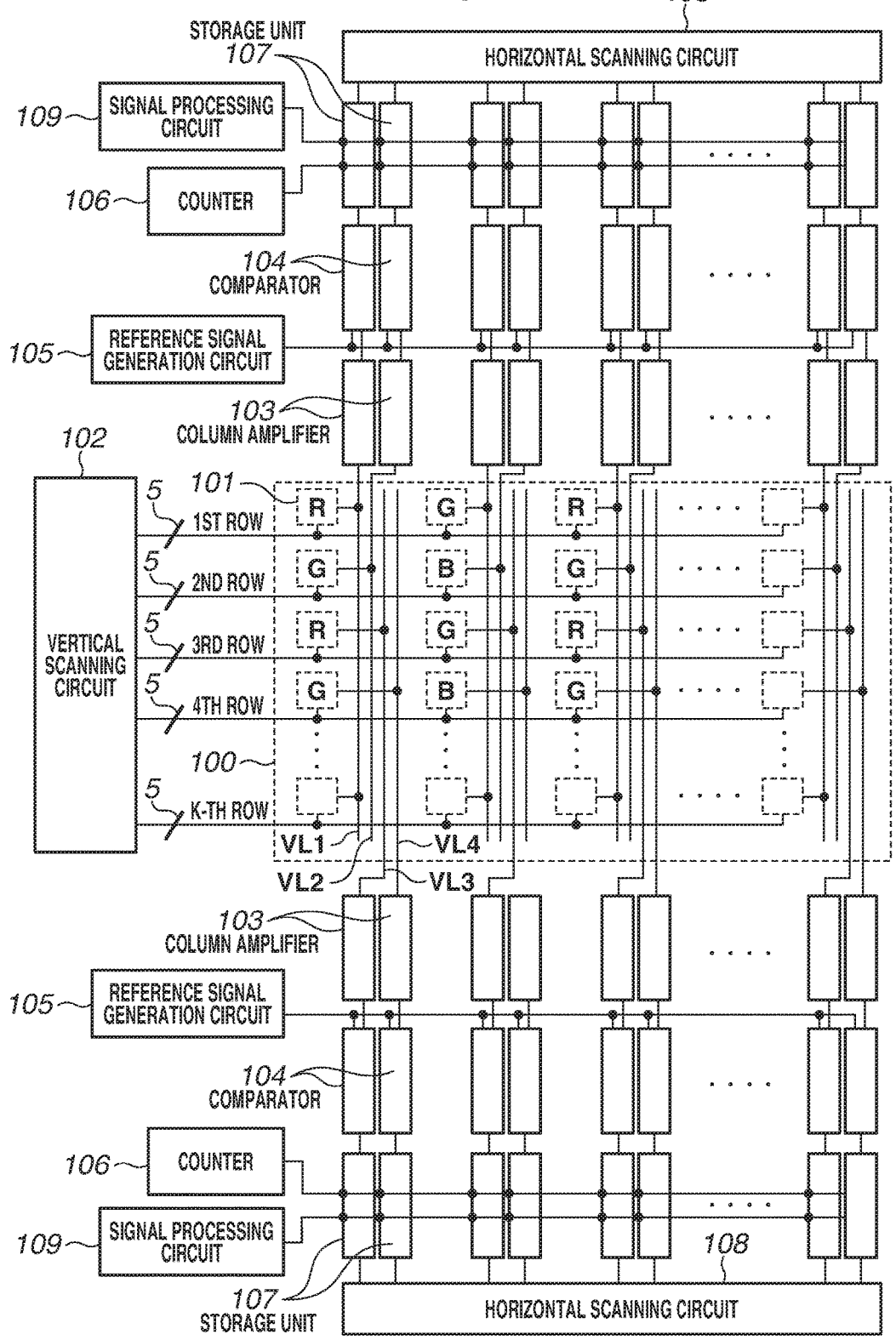
FIG. 1 schematically illustrates an entire configuration of an imaging device according to a first exemplary embodiment.

FIG. 1 is a block diagram schematically illustrating an entire configuration of an imaging device according to a first exemplary embodiment. A pixel assembly 100 includes a plurality of pixels 101 disposed in a predetermined pattern. In the present exemplary embodiment, one pixel 101 constitutes one pixel unit. The plurality of pixels 101 is disposed in a matrix pattern including a plurality of rows and a plurality of columns. Each pixel 101 can output a pixel signal derived from electric charge generated through photoelectric conversion. One of red (R), green (G), and blue (B) color filters is allocated to each pixel 101. Accordingly, each pixel 101 can receive light colored through a color filter disposed thereon. The plurality of color filters is disposed to form a usual Bayer arrangement.

In the present exemplary embodiment, the pixels 101 are disposed in a range extending from the first row to the K-th row. Further, a plurality of output lines VL is disposed for each column composed of the first to K-th pixels 101. More specifically, four output lines VL1, VL2, VL3, and VL4 are disposed. The pixel 101 disposed in the (N+1)-th row is connected to the output line VL1. In the present exemplary embodiment, N is an integer not smaller than 0. Similarly, the pixel 101 disposed in the (N+2)-th row is connected to the output line VL2. The pixel 101 disposed in the (N+3)-th row is connected to the output line VL3. The pixel 101 disposed in the (N+4)-th row is connected to the output line VL4. The configuration described above enables the imaging device to read out pixel signals in parallel from the pixels 101 disposed in the plurality of rows. In the following description of the present exemplary embodiment, the above-mentioned output lines will be denoted by unique reference numerals VL1, VL2, VL3, and VL4 when it is necessary to discriminate each line. On the other hand, four output lines will be simply denoted by the same symbol VL when it is unnecessary to discriminate each line.

A vertical scanning circuit 102 can supply a control signal for controlling the driving of the pixel 101 to the pixels 101 disposed in the same row. In the present exemplary embodiment, the control signals supplied from the vertical scanning circuit 102 can be categorized into five types. Accordingly, the vertical scanning circuit 102 is connected to five control lines disposed in each row, although FIG. 1 illustrates a single wiring that represents the five control lines disposed in each row.

The imaging device according to the present exemplary embodiment includes four column amplifiers 103 provided for each column composed of a plurality of pixels 101. When the vertical scanning circuit 102 selects four rows, signals of the pixels 101 disposed in the selected rows can be input in parallel to the four column amplifiers 103 via four output lines VL. Each column amplifier 103 can amplify the pixel signal read out from the corresponding pixel 101. The pixel signal amplified by each column amplifier 103 can be output from the column amplifier 103.

A comparator 104 is disposed for each column amplifier 103. Further, a reference signal generation circuit 105 is commonly connected to a plurality of comparators 104. The comparator 104 can receive the pixel signal amplified by the column amplifier 103 and a ramp waveform reference signal generated by the reference signal generation circuit 105. The comparator 104 compares the pixel signal with the reference signal and changes its output level from high-level to low-level, or from low-level to high-level, in response to each inversion of the magnitude relationship between the compared signal voltages.

A counter 106 is commonly connected to a plurality of storage units 107. The counter 106 performs a counting operation in response to the reference signal output from the reference signal generation circuit 105, and outputs a count value. The storage unit 107 can store the count value output from the counter 106 as digital data at output shift timing of a corresponding comparator 104.

A horizontal scanning circuit 108 can successively read the digital data stored in the storage unit 107 disposed in respective columns and send the read digital data to a signal processing circuit 109. The signal processing circuit 109 can perform correlated dual sampling (CDS) processing and other (e.g., addition) processing.

The imaging device performs the above-mentioned operation for reading the pixel signal from the pixel 101 when the vertical scanning circuit 102 selects a pixel row of the pixel assembly 100. The column amplifier 103, the comparator 104, and the storage unit 107 cooperatively constitute a column circuit.

Figure 2:
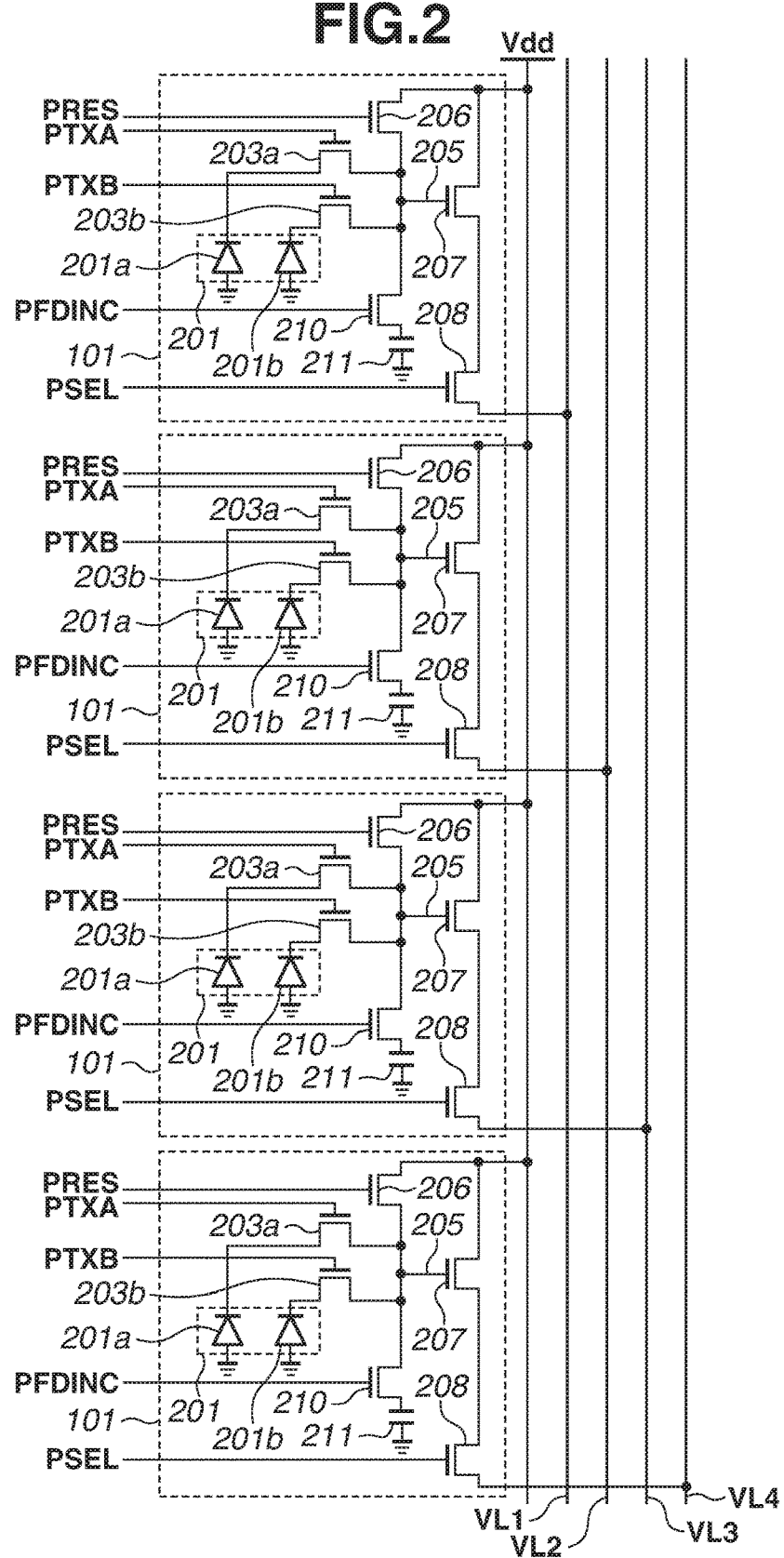
FIG. 2 illustrates an equivalent circuit of pixels provided in the imaging device.

FIG. 2 is an equivalent circuit of the pixels 101. A photodiode (hereinafter, referred to as "PD") 201 can convert incident light into electric charge through photoelectric conversion. In other words, the PD 201 is an example of a photoelectric conversion portion. In the present exemplary embodiment, the pixel 101 includes two photodiodes (i.e., PD 201a and PD 201b) that are connected in parallel to each other. In other words, the pixel 101 according to the present exemplary embodiment includes a plurality of photoelectric conversion portions.

Each of the PD 201a and the PD 201b includes a first conductive type (e.g., N type) semiconductor region that can store electric charges. The first conductive type semiconductor region and a neighboring second conductive type (e.g., P type) semiconductor region cooperatively constitute a PN junction. The first conductive type semiconductor region of the PD 201a and the first conductive type semiconductor region of the PD 201b are electrically separated from each other.

The PD 201a and the PD 201b are disposed under a single micro-lens. The imaging device can perform focus detection by independently reading a pixel signal derived from electric charge generated by the PD 201a and a pixel signal derived from electric charge generated by the PD 201b. On the other hand, it is feasible to add the electric charge generated by the PD 201a and the electric charge generated by the PD 201b. The imaging device can perform image generation based on a pixel signal derived from the added electric charge.

A transfer transistor 203a can transfer the electric charge generated by the PD 201a to an input node 205. Similarly, a transfer transistor 203b can transfer the electric charge generated by the PD 201b to the input node 205. The transfer transistor 203a and the transfer transistor 203b cooperatively constitute a transfer portion of the pixel 101. The transfer transistor 203a has a gate terminal connected to a transfer control line PTXA. The transfer transistor 203b has a gate terminal connected to a transfer control line PTXB.

The input node 205 can receive the electric charges transferred via the transfer transistors 203a and 203b. The input node 205 is configured to be in an electrically floating state. Therefore, a voltage generated at the input node 205 represents the transferred electric charge amount. More specifically, the input node 205 has an electric charge voltage conversion function. In a case where the imaging device is formed on a semiconductor substrate, the input node 205 can be constituted, for example, by a first conductive type floating diffusion region (hereinafter, referred to as "FD region").

The input node 205 is connected to a gate terminal of an amplification transistor 207. The amplification transistor 207 can output a signal representing the voltage of the input node 205 to the output line VL. In other words, the input node 205 and the amplification transistor 207 cooperatively constitute an output portion of the pixel 101. For example, the amplification transistor 207 has a drain terminal to which a power source voltage Vdd is supplied. The amplification transistor 207 and a current source connected to the output line VL cooperatively constitute a source follower circuit. When the above-mentioned configuration is employed, the amplification transistor 207 can constitute the output portion. As another example, the amplification transistor 207 may constitute a differential amplification circuit. The above-mentioned FD region, the gate terminal of the amplification transistor 207, and an electrically conductive member connecting both of them may cooperatively constitute the input node 205.

A reset transistor 206 can reset the voltage of the input node 205. The reset transistor 206 has a drain terminal connected to a node via which a reset voltage (e.g., power source voltage Vdd) can be supplied. Accordingly, the voltage of the input node 205 can be reset when the reset transistor 206 turns on. The reset transistor 206 has a gate terminal electrically connected to a reset control line PRES. The reset transistor 206 can be controlled to ON or OFF according to a control signal PRES supplied to the reset control line PRES. In the present exemplary embodiment, the reset transistor 206 constitutes a reset portion that can reset the input node 205.

A selection transistor 208 is disposed in an electric path connecting the amplification transistor 207 to the output line VL. The selection transistor 208 has a gate terminal electrically connected to a selection control line PSEL. The selection transistor 208 can be controlled to ON or OFF according to a control signal PSEL. When the selection transistor 208 is ON, a pixel signal can be output from a corresponding amplification transistor 207 to the output line VL. It is feasible to select the pixel 101 from which the pixel signal should be output by turning on the selection transistor 208 of a part of selected pixels 101 (i.e., a part of a plurality of pixels 101 connected to the same output line VL) and turning off the selection transistors 208 of other non-selected pixels 101. Two or more pixels 101 connected to the same output line VL may be simultaneously selected.

A capacitance control unit 210 is connected to the input node 205. The capacitance control unit 210 includes, at least, a gate electrode that can receive a control signal PFDINC. The gate electrode of the capacitance control unit 210 is disposed on a second conductive type semiconductor region disposed adjacently to the above-mentioned FD region, via an insulating film. The capacitance control unit 210 can control the capacitance of the input node 205 to be a first capacitance value C1 or a second capacitance value C2, which is greater than the first capacitance value C1, according to the control signal PFDINC.

For example, the capacitance control unit 210 can be constituted by a transistor that includes an FD region, a gate electrode, and a semiconductor region that is similar to the FD region in conductive type. In the present exemplary embodiment, the equivalent circuit illustrated in FIG. 2 includes a capacitance 211 that is constituted by a semiconductor region similar to the FD region in conductive type. The capacitance 211 includes a capacitance component of a PN junction that a semiconductor region similar to the FD region in conductive type has.

The transistor that constitutes the capacitance control unit 210 can be controlled to ON or OFF in response to the control signal PFDINC. The above-mentioned configuration can realize connection and disconnection selectively performed between the input node 205 and the capacitance 211. When the capacitance 211 is not connected, the capacitance of the input node 205 has the first capacitance value C1. When the capacitance 211 is connected, the capacitance of the input node 205 has the second capacitance value C2.

As mentioned above, the capacitance control unit 210 and the capacitance 211 are operable as a capacitance changing unit configured to change the capacitance of the input node 205. The above-mentioned configuration can realize switching of the gain, which represents a conversion ratio of the pixel signal output from the amplification transistor 207 to the amount of electric charge transferred to the input node 205. In general, the capacitance of the input node 205 and the gain are in an inverse proportional relationship. A gain obtained when the capacitance 211 is connected to the input node 205 is smaller than a gain obtained when the capacitance 211 is not connected to the input node 205. As mentioned above, the imaging device according to the present exemplary embodiment can switch the gain of the pixel 101 according to the control signal PFDINC.

The configuration of the capacitance control unit 210 is not limited to the example illustrated in FIG. 2, in which the transistor and the capacitance 211 are separated into two devices. The capacitance control unit 210 can be modified appropriately if it is feasible to control the capacitance of the input node 205 to the first capacitance value C1 or the second capacitance value C2, which is greater than the first capacitance value C1, according to the control signal PFDINC. As another example, a MOS-type capacitance is employable to realize the above-mentioned function of the capacitance control unit 210. For example, a MOS-type transistor can be configured to have a short-circuit terminal, which is obtainable by short-circuiting source and drain terminals. In this case, a capacitance between the short-circuit terminal and the remaining terminal (gate terminal) can be used as the MOS-type capacitance. The MOS-type capacitance having the above-mentioned configuration is functionally operable as a variable capacitance element, the capacitance of which is variable depending on the voltage between the terminals. Therefore, the above-mentioned MOS-type capacitance is applicable as the capacitance changing unit capable of changing the capacitance of the input node 205. Alternatively, as another example, a MOS-type transistor configured to omit the source terminal or the drain terminal is employable to realize the MOS-type capacitance. More specifically, the configuration that does not include a conductive type semiconductor region similar to the above-mentioned FD region is employed.

The capacitance control unit 210 enables the imaging device to perform an image-capturing operation optimized according to image capturing conditions. When the capacitance of the input node 205 is increased, a larger amount of electric charge is storable although the gain is reduced. Therefore, setting the capacitance of the input node 205 to be greater will be suitable if the quantity of incident light is larger as one of the image capturing conditions. On the other hand, when the capacitance of the input node 205 is reduced, the gain becomes greater although the storable electric charge amount is reduced. Therefore, setting the capacitance of the input node 205 to be smaller will be suitable if the quantity of incident light is smaller as one of the image capturing conditions.

Subsequently, an operation that can be performed by the imaging device according to the present exemplary embodiment will be described in detail below. The imaging device according to the present exemplary embodiment is operable in a first mode and a second mode. For example, the imaging device can perform switching between the first mode and the second mode based on an appropriate image capturing condition, such as the quantity of incident light from an imaging target object. When the selected mode is the first mode, the output portion of the pixel 101 outputs a pixel signal in a state where the capacitance value of the input node 205 is the first capacitance value C1. When the selected mode is the second mode, the output portion of the pixel 101 outputs a pixel signal in a state where the capacitance value of the input node 205 is the second capacitance value C2.

An operation that can be performed by the imaging device in the second mode will be described in detail below with reference to a timing chart of FIG. 3. FIG. 3 illustrates various control signals to be supplied to the pixels 101. As mentioned above, in the present exemplary embodiment, the pixels 101 disposed in four rows output pixel signals in parallel. As illustrated in FIG. 3, the imaging device commonly supplies control signals (suffixed by 1) to the pixels 101 disposed in a region ranging from the N-th row to the (N+3)-th row, and commonly supplies control signals (suffixed by 2) to the pixels 101 disposed in a region ranging from the (N+4)-th row to the (N+7)-th row. When the control signal is high, a corresponding transistor turns on. When the control signal is low, a corresponding transistor turns off.

In a period from time t1 to time t9, the imaging device reads out pixel signals from the pixels 101 disposed in the N-th row to the (N+3)-th row. Subsequently, in a period from time t10 to time t18, the imaging device reads out pixel signals from the pixels 101 disposed in the (N+4)-th row to the (N+7)-th row. In the period during which the imaging device performs the reading operation, the corresponding control signal PSEL is kept high. Further, in the second mode, the control signal PFDINC is constantly high. Therefore, the capacitance of the input node 205 is constantly controlled to the second capacitance value C2.

First, an operation for reading the pixel signals from the pixels 101 disposed in the N-th row to the (N+3)-th row will be described in detail below. In a period from time t1 to time t2, the reset transistor 206 is ON. Therefore, a reset operation for resetting the voltage of the input node 205 is continuously performed in this period.

Subsequently, in a period from time t2 to time t3, the amplification transistor 207 of the pixel 101 outputs a noise signal including reset noises, as a pixel signal. The output noise signal is then subjected to analog/digital conversion (hereinafter, referred to as "AD conversion") performed in the column circuit.

In a period from time t3 to time t4, the transfer transistor 203a transfers the electric charge of the PD 201a to the input node 205. Subsequently, in a period from time t4 to time t5, the amplification transistor 207 of the pixel 101 outputs a first light signal derived from the electric charge generated by the PD 201a (hereinafter, referred to as "A signal") to the output line VL, as a pixel signal. The output A signal is then subjected to the AD conversion performed in the column circuit.

In a period from time t5 to time t6, the transfer transistor 203a and the transfer transistor 203b turn on. The above-mentioned configuration enables the generated electric charges to be transferred from the PD 201a and the PD 201b to the input node 205. The electric charges transferred from the PD 201a and the PD 201b are added at the input node 205. Accordingly, in a period from time t6 to time t7, the amplification transistor 207 of the pixel 101 outputs a second light signal derived from the electric charges generated by the PD 201a and the PD 201b (hereinafter, referred to as "A+B" signal). The output "A+B" signal is then subjected to the AD conversion performed by the column circuit.

In the present exemplary embodiment, the control signal PFDINC is constantly high. Therefore, in a state where the capacitance of the input node 205 is the second capacitance value C2, the amplification transistor 207 of the pixel 101 performs an output operation for outputting the noise signal, the "A" signal, and the "A+B" signal, which have been described above.

The horizontal scanning circuit 108 transfers the noise signal, the "A" signal, and the "A+B" signal (i.e., the signals having been converted into digital signals) to the signal processing circuit 109. The signal processing circuit 109 performs CDS processing based on the noise signal, the "A" signal, and the "A+B" signal.

Next, the driving signal PRES becomes high at time t8. Therefore, the reset operation is performed. At time t9, the imaging device switches the control signal PSEL to low to terminate the operation for reading out the pixel signals from the pixels 101 disposed in the Nth row to the (N+3)-th row.

In the period from time t10 to time t18, the imaging device performs an operation for the pixels 101 disposed in the (N+4)-th row to the (N+7)-th row, which is similar to the above-mentioned operation performed in the period from time t1 to time t9. An operation for reading out pixel signals from the pixels 101 disposed in the (N+4)-th row to the (N+7-th row is similar to the operation for reading out the pixel signals from the pixels 101 disposed in the Nth row to the (N+3)-th row.

Figure 4:
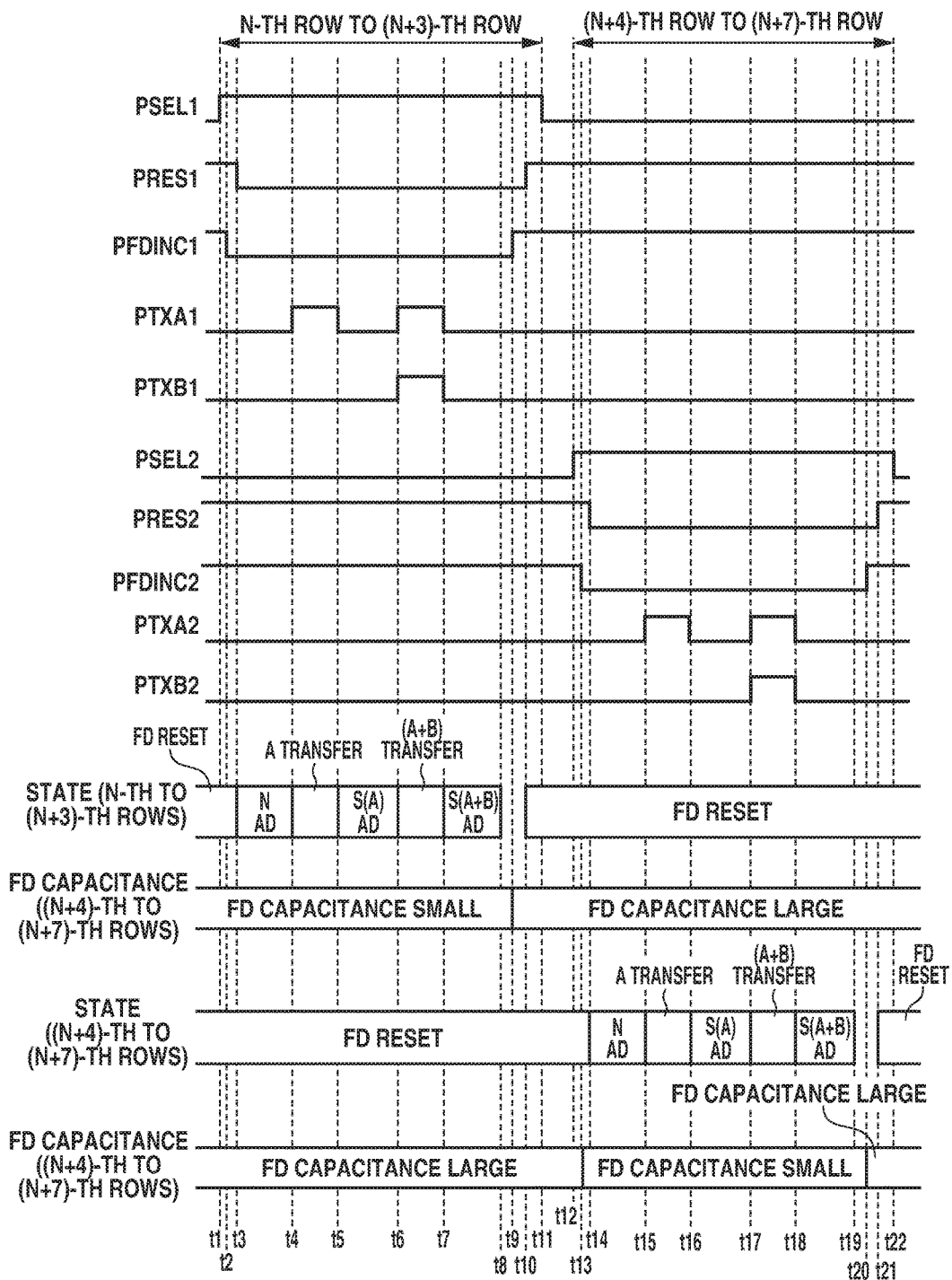
FIG. 4 is a timing chart illustrating control signals used to drive the imaging device.

An operation that can be performed by the imaging device in the first mode will be described in detail below with reference to a timing chart illustrated in FIG. 4. FIG. 4 illustrates various control signals to be supplied to the pixels 101. As illustrated in FIG. 4, the imaging device commonly supplies control signals (suffixed by 1) to the pixels 101 disposed in the N-th row to the (N+3)-th row, and commonly supplies control signals (suffixed by 2) to the pixels 101 disposed in the (N+4)-th row to the (N+7)-th row. When the control signal is high, a corresponding transistor turns on. When the control signal is low, a corresponding transistor turns off.

In a period from time t1 to time t11, the imaging device reads out pixel signals from the pixels 101 disposed in the N-th row to the (N+3)-th row. Subsequently, in a period from time t12 to time t22, the imaging device reads out pixel signals from the pixels 101 disposed in the (N+4)-th row to the (N+7)-th row. In the period during which the imaging device performs the reading operation, the corresponding control signal PSEL is kept high.

The first mode is different from the second mode in that the amplification transistor 207 outputs a pixel signal in a state where the capacitance of the input node 205 has been controlled to the first capacitance value C1. Therefore, the control signal PFDINC is low in a limited period. More specifically, in a period from time t2 to time t9, the control signal PFDINC1 is low. Further, in a period from time t13 to time t21, the control signal PFDINC2 is low.

The rest of the operation to be performed in the first mode is similar to the operation performed in the second mode. Corresponding operations are indicated in the "STATE" fields of FIGS. 3 and 4. Therefore, redundant description thereof will be avoided.

In the first mode, the amplification transistor 207 outputs a pixel signal in the state where the capacitance of the input node 205 has been controlled to the first capacitance value C1. In other words, the amplification transistor 207 outputs a pixel signal in a state where the capacitance 211 is not connected to the input node 205. However, the imaging device performs an operation for resetting the input node 205 in the state where the capacitance 211 is connected to the input node 205. If there is an electric potential difference between the input node 205 and the capacitance 211, there will be a possibility of generating leak current flowing to the input node 205. Resetting the voltage of the input node 205 in the state where the capacitance 211 is connected to the input node 205 is useful in eliminating such a potential difference. As a result, the imaging device can reduce the noise caused by the leakage current.

In the present exemplary embodiment, the imaging device resets the input node 205 after completing the operation for reading out the pixel signals from the pixels 101. An example reset operation for the pixels 101 disposed in the N-th row to the (N+3)-th row will be described in detail below. First, the control signal PFDINC becomes high at time t9. In this state, the control signal PRES is low. Accordingly, the imaging device can switch the capacitance of the input node 205 from the first capacitance value C1 to the second capacitance value C2 in a state where the reset transistor 206 is off. Subsequently, the control signal PRES becomes high at time t9. In this state, the control signal PFDINC is high. Accordingly, the imaging device can control the reset transistor 206 from off to on in the state where the capacitance of the input node 205 is the second capacitance value C2. Through the above-mentioned processes, the imaging device completes the operation for resetting the input node 205. The imaging device maintains the above-mentioned state until a pixel signal reading operation for the next frame starts. When the pixel signal reading operation for the next frame starts, the control signal PFDINC becomes low again. In other words, the imaging device can output the pixel signal in the state where the capacitance of the input node 205 has been controlled to the first capacitance value C1.

As mentioned above, in the present exemplary embodiment, the reset transistor 206 turns on after the capacitance control unit 210 completes the switching of the capacitance of the input node 205 from the first capacitance value C1 to the second capacitance value C2, which is greater than the first capacitance value C1. Through the above-mentioned control, the imaging device can suppress the variation in voltage of the input node 205 that may occur during the reset operation. This is because the capacitance of the input node 205 is so great that the voltage variation caused by coupling can be reduced during the operation of the reset transistor 206.

As mentioned above, the imaging device performs the output operation for outputting pixel signals from the next frame after completing the reset operation. If the voltage of the input node 205 greatly changes in the reset operation, there will be a possibility of failing in stabilizing the variation in voltage before starting the output operation. As a result, there will be a possibility of generating noises. Reducing the variation in voltage of the input node 205 that may occur during the reset operation is useful for reducing the above-mentioned noises.

Further, in a case where a single reset control line PRES is connected to the pixels 101 disposed in 1000 columns or more, there will be a possibility of causing a variation in waveform of the control signal PRES according to the position of the pixel 101. In a plurality of pixels 101, there will be a possibility of causing a different potential variation at the input node 205 if a different control signal PRES is supplied to the gate terminal of the reset transistor 206 even if a parasitic capacity between the input node 205 and the gate terminal of the reset transistor 206 remains constant. Accordingly, there will be a possibility of causing a difference in reset state of the input node 205 between respective columns. Such a difference in reset state will induce a reduction in image quality that may be caused by shading. It is feasible to reduce the difference in reset state between respective columns by reducing the variation in voltage of the input node 205 during the reset operation. As a result, the shading can be reduced and the image quality can be improved.

As mentioned above, the imaging device according to the present exemplary embodiment controls the reset transistor 206 from off to on after the capacitance control unit 210 switches the capacitance of the input node 205 from the first capacitance value C1 to the second capacitance value C2, which is greater than the first capacitance value C1. The above-mentioned configuration is useful for reducing the noises.

A second exemplary embodiment will be described in detail below. The present exemplary embodiment is different from the first exemplary embodiment in that one pixel unit includes a plurality of pixels. Further, a part of an internal circuit provided in a pixel unit is commonly used by a plurality of pixels provided in the same pixel unit. Therefore, an operation for reading out pixel signals from respective pixels is different from that described in the first exemplary embodiment. Hereinafter, features not described in the first exemplary embodiment will be mainly described in detail below. If a constituent component or a portion is similar to that already described in the first exemplary embodiment, redundant description thereof will be avoided.

Figure 5:
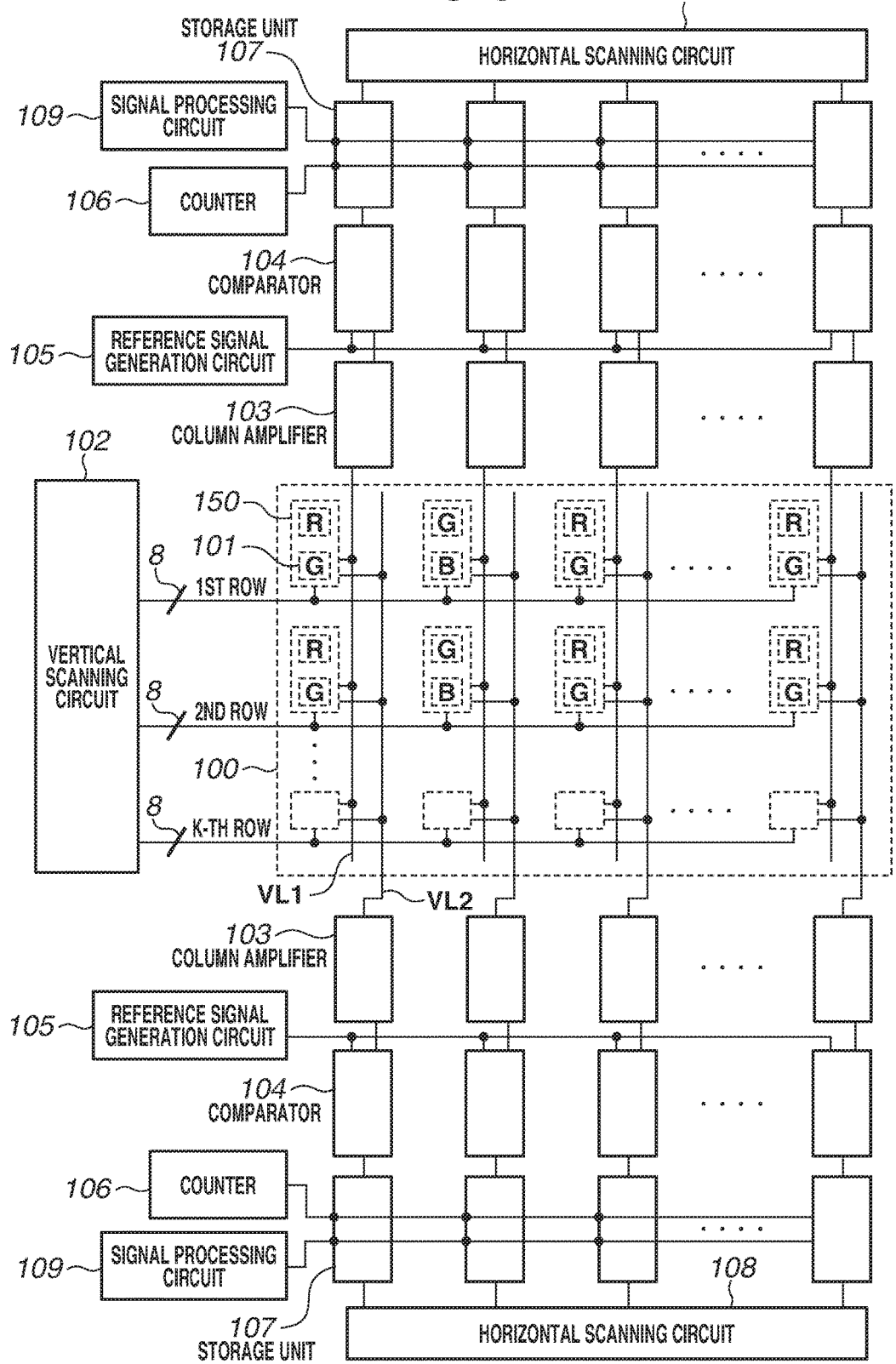
FIG. 5 schematically illustrates an entire configuration of an imaging device according to a second exemplary embodiment.

FIG. 5 is a block diagram schematically illustrating an entire configuration of an imaging device according to the present exemplary embodiment. A pixel assembly 100 includes a plurality of pixels 101 disposed in a predetermined pattern. The present exemplary embodiment is similar to the first exemplary embodiment in that a plurality of pixels 101 is disposed in a matrix pattern and a predetermined color filter is allocated to each pixel 101. In the present exemplary embodiment, two pixels 101 cooperatively constitute one pixel unit 150. Therefore, in the present exemplary embodiment, each row is defined by the pixel unit 150 defines. More specifically, the pixel assembly 100 illustrated in FIG. 5 includes pixel units 150 disposed in the first row to the K-th row. In other words, the pixel assembly 100 includes a plurality of pixels 101 disposed in 2×K rows.

The imaging device according to the present exemplary embodiment includes two output lines VL1 and VL2 disposed for each column of the pixels 101. One pixel unit 150 is connected to both of the output lines VL1 and VL2.

A vertical scanning circuit 102 can supply a control signal for controlling the driving of the pixels 101 to the pixels 101 disposed in the same row. In the present exemplary embodiment, the vertical scanning circuit 102 supplies eight types of control signals to one pixel unit 150, i.e., two pixels 101.

Accordingly, the vertical scanning circuit 102 is connected to eight control lines disposed in each row, although FIG. 5 illustrates a single wiring that represents the eight control lines disposed in each row.

The imaging device according to the present exemplary embodiment includes column amplifiers 103, comparators 104, a reference signal generation circuit 105, a counter 106, storage units 107, a horizontal scanning circuit 108, and a signal processing circuit 109 that are similar to those described in the first exemplary embodiment. However, in the present exemplary embodiment, two column circuits are disposed for one column.

Figure 6:
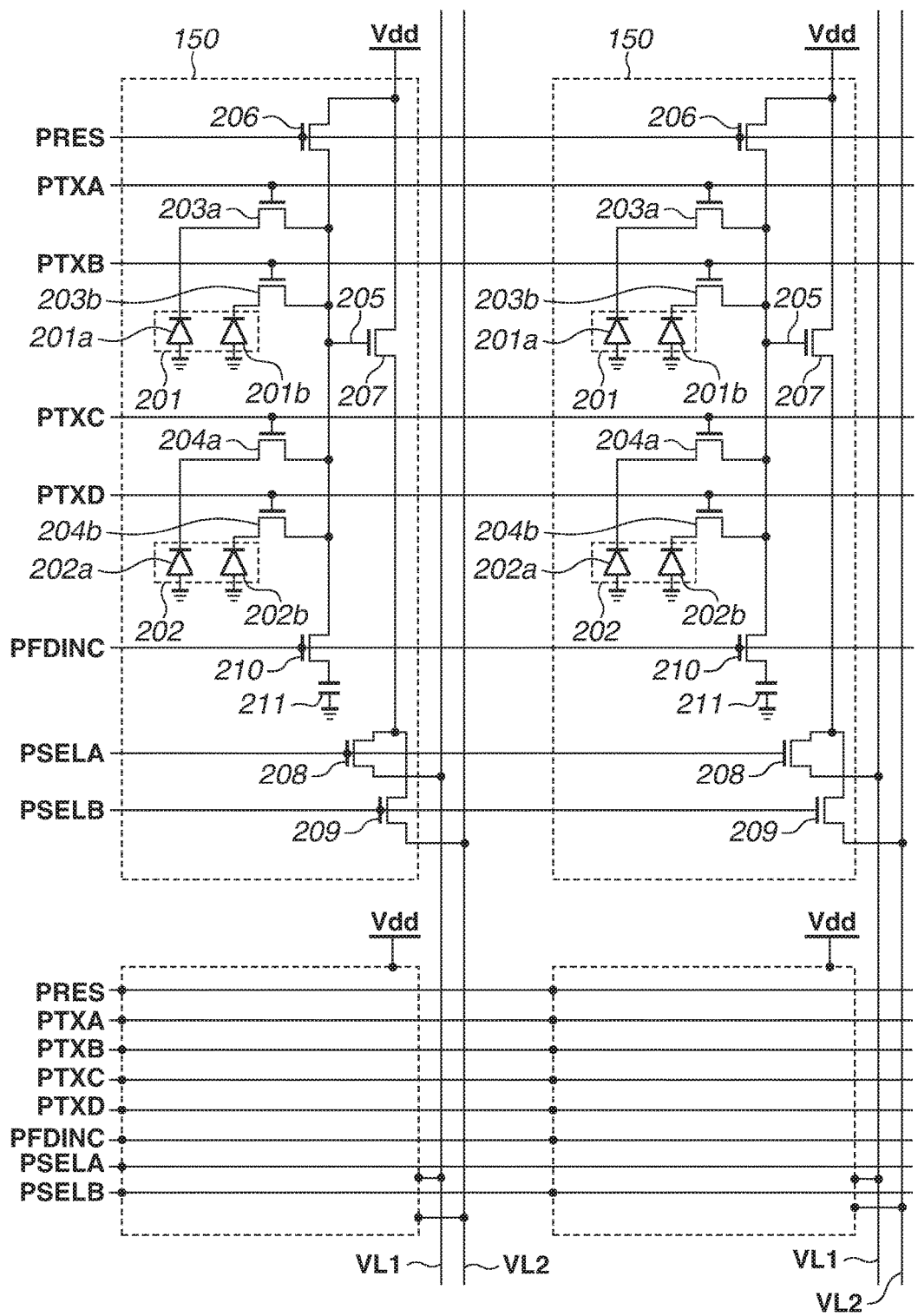
FIG. 6 illustrates an equivalent circuit of pixels provided in the imaging device.

FIG. 6 is an equivalent circuit of the pixel 101. In the following description, two pixels 101 included in one pixel unit 150 are referred to as a first pixel 101 and a second pixel 101. The first pixel 101 includes a PD 201a and a PD 201b that cooperatively constitute a photoelectric conversion portion. The PD 201a and the PD 201b are similar to the PD 201a and the PD 201b described in the first exemplary embodiment. The second pixel 101 includes a PD 202a and a PD 202b that cooperatively constitute a photoelectric conversion portion. Although affixed reference numerals are different, the PD 202a and the PD 202b are similar to the PD 201a and the PD 201b described in the first exemplary embodiment. The PD 201a and the PD 201b are disposed under a single micro-lens. The PD 202a and the PD 202b are disposed under another single micro-lens. Redundant description of the photoelectric conversion portion will be avoided.

The first pixel 101 includes a transfer transistor 203a and a transfer transistor 203b. The transfer transistor 203a and the transfer transistor 203b illustrated in FIG. 6 are similar to the transfer transistor 203a and the transfer transistor 203b described in the first exemplary embodiment, except for the following features. The transfer transistor 203a illustrated in FIG. 6 has a gate terminal connected to a transfer control line PTXA. The transfer transistor 203b illustrated in FIG. 6 has a gate terminal connected to a transfer control line PTXB. The second pixel 101 includes a transfer transistor 204a and a transfer transistor 204b. Although affixed reference numerals are different, the transfer transistor 204a and the transfer transistor 204b are similar to the transfer transistor 203a and the transfer transistor 203b described in the first exemplary embodiment, except for the following features. The transfer transistor 204a has a gate terminal connected to a transfer control line PTXC. The transfer transistor 204b has a gate terminal connected to a transfer control line PTXD. Redundant description of the transfer portion thereof will be avoided.

One pixel unit 150 includes an input node 205, a reset transistor 206, an amplification transistor 207, a capacitance control unit 210, and a capacitance 211. These constituent components are similar to those described in the first exemplary embodiment and therefore redundant description thereof will be avoided. As mentioned above, in the present exemplary embodiment, two pixels 101 included in the same pixel unit 150 commonly use, for example, the amplification transistor 207. Therefore, the number of transistors to be disposed for each pixel can be reduced.

One pixel unit 150 includes a selection transistor 208 and a selection transistor 209. Each of the selection transistor 208 and the selection transistor 209 has a function similar to that of the selection transistor 208 described in the first exemplary embodiment. The selection transistor 208 can connect the amplification transistor 207 to the output line VL1. Further, the selection transistor 208 can connect the amplification transistor 207 to the output line VL2. The selection transistor 208 has a gate terminal connected to a control line PSELA. The selection transistor 209 has a gate terminal connected to a control line PSELB. The above-mentioned configuration enables the pixel unit 150 to output a pixel signal to an arbitrary one of a plurality of output lines VL.

Subsequently, an operation that can be performed by the imaging device according to the present exemplary embodiment will be described in detail below. The imaging device according to the present exemplary embodiment is operable in a first mode and in a second mode. For example, the imaging device can perform switching between the first mode and the second mode based on an appropriate image capturing condition, such as the quantity of incident light from an imaging target object. When the selected mode is the first mode, the output portion of pixel unit 150 outputs a pixel signal in a state where the capacitance value of the input node 205 is the first capacitance value C1. When the selected mode is the second mode, the output portion of the pixel unit 150 outputs a pixel signal in a state where the capacitance value of the input node 205 is the second capacitance value C2.

Figure 7:
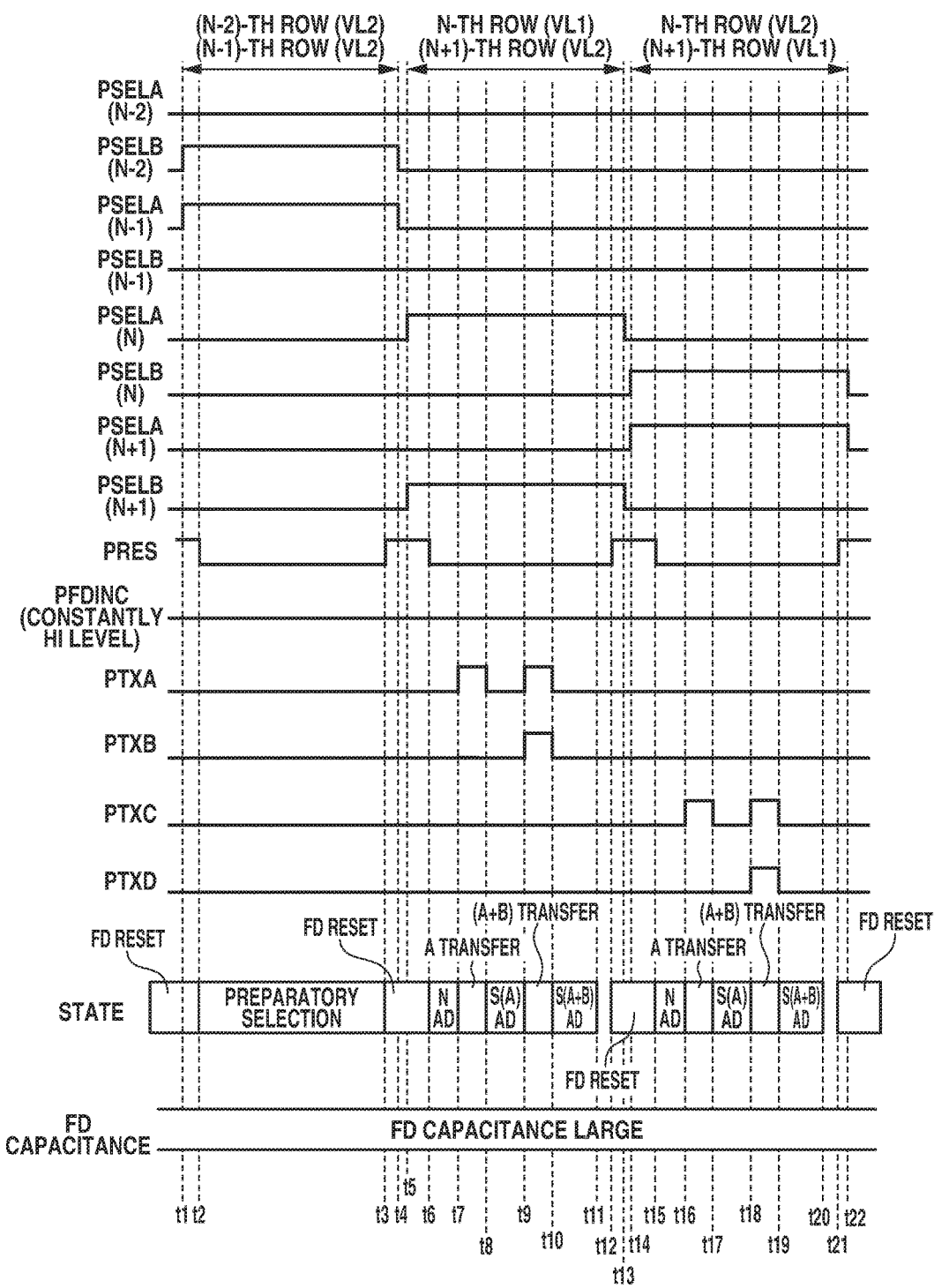
FIG. 7 is a timing chart illustrating control signals used to drive the imaging device.

An operation that can be performed by the imaging device in the second mode will be described in detail below with reference to a timing chart illustrated in FIG. 7. FIG. 7 illustrates various control signals to be supplied to the pixels 101. As illustrated in FIG. 7, the imaging device supplies selection control signals PSELA(N−2) to PSELA(N+1) and PSELB(N−2) to (N+1) to the pixel units 150 disposed in a region ranging from the (N−2)-th row to the (N+1)-th row. Because a plurality of selection control signals is supplied to a plurality of rows, a suffixed numeral indicates a corresponding row in FIG. 7. Further, as illustrated in FIG. 7, the imaging device commonly supplies control signals PRES, PFDINC, PTXA, PTXB, PTXC, and PTXD to the pixel units 150 disposed in the N-th row and the (N+1)-th row. When the control signal is high, a corresponding transistor turns on. When the control signal is low, a corresponding transistor turns off.

In a period from time t1 to time t4 illustrated in FIG. 7, the imaging device reds out pixel signals from the pixel units 150 disposed in the (N−2)-th row and the (N−1)-th row in parallel. Further, in a period from time t5 to time t13, the imaging device reads out pixel signals from the pixel units 150 disposed in the N-th row and from the pixel units 150 disposed in the (N+1)-th row in parallel. Each pixel unit 150 includes two pixels 101. Therefore, in a period from time t14 to time t22, the imaging device further reads out pixel signals from the pixel units 150 disposed in the N-th row and from the pixel units 150 disposed in the (N+1)-th row in parallel. In a period from time t5 to time t13, the imaging device reads out pixel signals from the first pixels 101 of respective pixel units 150. Further, in a period from time t14 to time t22, the imaging device reads out pixel signals from the second pixels 101 of respective pixel units 150.

An operation to be performed in each period is similar to that described in the first exemplary embodiment. Therefore, redundant description thereof will be avoided. Corresponding operations are indicated in the "STATE" field of FIG. 7 and redundant description thereof will be avoided. However, in the present exemplary embodiment, the selection control signal PSELA and the selection control signal PSELB are constituted in such a manner that the pixel signals of the pixel units 150 disposed in the N-th row and the pixel signals of the pixel units 150 disposed in the (N+1)-th row can be output to mutually different output lines VL. For example, in a period in which control signals PSELA(N) to be supplied to the pixel units 150 disposed in the N-th row are high, the control signal PSELA(N+1) to be supplied to the pixel units 150 disposed in the (N+1)-th row are low. On the other hand, a selection control signal PSELB(N+1) is high. Further, whether the pixel signal is read out which one of two pixels 101 included in one pixel unit 150 is controlled based on the control signal PTXA, the control signal PTXB, the control signal PTXC, and the control signal PTXD.

In the present exemplary embodiment, the imaging device releases the reset state of the input node 205 of each pixel unit 150 disposed in the N-th row and the (N+1)-th row in the period of reading out the pixel signals from the pixel units 150 disposed in the (N−2)-th row and the (N−1)-th row. The above-mentioned operation is referred to as "preparatory selection". The reset releasing state is the state where the reset transistor 206 is off.

In the present exemplary embodiment, two pixels 101 commonly include one input node 205. In this case, when a reset operation for reading out pixel signals from the first pixels 101 is compared to a reset operation for reading out pixel signals from the second pixels 101, there will be a possibility of causing a difference in the time interval from starting of the reset operation to releasing of the reset state. As a result, there will be a possibility of generating streak noises in each row. Performing the above-mentioned preparatory selection enables the imaging device to promote the releasing of electric charges trapped in a gate insulating film of the reset transistor and to reduce shading and pattern noises that may be caused by reset level variation.

More specifically, in the period from time t1 to time t4, the imaging device selects the pixel units 150 disposed in the (N−2)-th row and the (N−1)-th row in response to the control signal PSELB(N−2) and a control signal PSELA(N−1). On the other hand, the imaging device does not select the pixel units 150 in the N-th row and the (N+1)-th row. However, to perform the above-mentioned preparatory selection, the imaging device switches the control signal PRES to be supplied to the pixel units 150 disposed in the N-th row and the (N+1)-th row to low at time t2. Through the above-mentioned operation, the imaging device brings the input node 205 of each of the pixel units 150 disposed in the Nth row and in the (N+1)-th row into the reset releasing state. Subsequently, the control signal PRES turns into high at time t3. Therefore, the imaging device performs the reset operation for the input node 205 of each of the pixel units 150 disposed in the Nth row and the (N+1)-th row. The control signal PSELB(N−2) and the control signal PSELA (N−1) become low at time t4. Thus, the imaging device terminates the selection state of the pixel units 150 disposed in the (N−2)-th row and the (N−1)-th row. Subsequently, the control signal PSELA(N) and the control signal PSELB(N+1) become high at time t5. Therefore, the imaging device selects the pixel units 150 disposed in the N-th row and the pixel units 150 disposed in the (N+1)-th row. The rest of the operation is similar to the operation performed in the first exemplary embodiment.

In the second mode, the control signal PFDINC is constantly high. Therefore, in the state where the capacitance of the input node 205 is the second capacitance value C2, the amplification transistor 207 of each pixel unit 150 performs the output operation for outputting the noise signal, the "A" signal, and the "A+B" signal.

Figure 8:
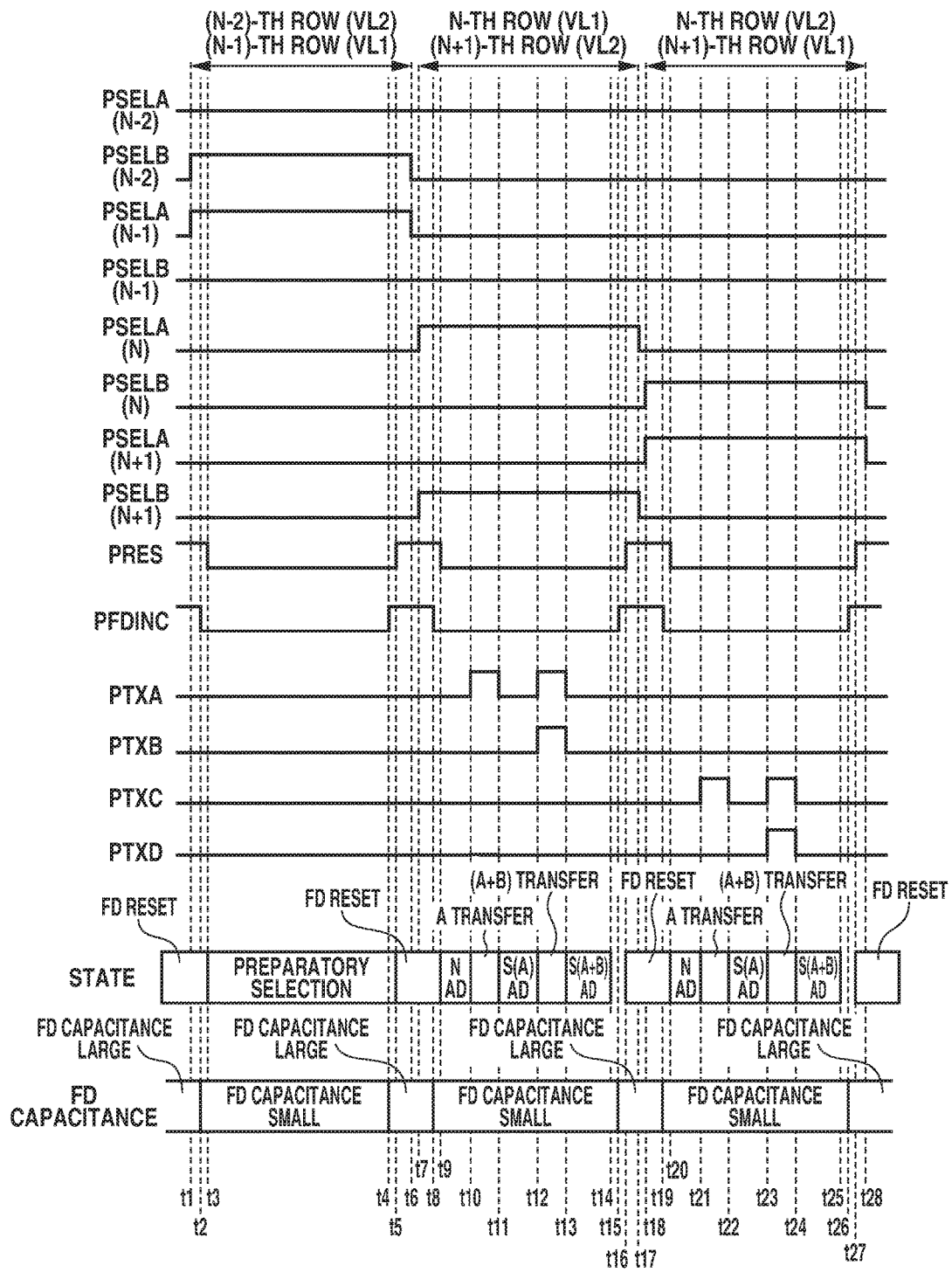
FIG. 8 is a timing chart illustrating control signals used to drive the imaging device.

An operation that can be performed by the imaging device in the first mode will be described in detail below with reference to a timing chart illustrated in FIG. 8. FIG. 8 illustrates various control signals to be supplied to the pixels 101. The control signals illustrated in FIG. 8 are similar to those illustrated in FIG. 7.

In a period from time t1 to time t6 illustrated in FIG. 8, the imaging device reads out pixel signals from the pixel units 150 disposed in the (N−2)-th row and from the pixel units 150 disposed in the (N−1)-th row in parallel. Further, in a period from time t7 to time t17, the imaging device reads out pixel signals from the pixel units 150 disposed in the N-th row and from the pixel units 150 disposed in the (N+1)-th row in parallel. Each pixel unit 150 includes two pixels 101. Therefore, in a period from time t18 to time t28, the imaging device reads out pixel signals from the pixel units 150 disposed in the N-th row and from the pixel units 150 disposed in the (N+1)-th row in parallel. In the period from time t7 to time t17 and in the period from time t18 to time t28, the imaging device reads out pixel signals from different pixels 101 provided in each pixel unit 150.

The first mode is different from the second mode in that the amplification transistor 207 outputs a pixel signal in the state where the capacitance of the input node 205 has been controlled to the first capacitance value C1. Therefore, the control signal PFDINC is low in a limited period. More specifically, the control signal PFDINC1 is low in a period from time t8 to time t15 and in a period from time t19 to time t26.

Further, in the present exemplary embodiment, the imaging device controls the capacitance of the input node 205 to the first capacitance value C1 in a part of the preparatory selection period. More specifically, in a period from time t2 to time t4, the control signal PFDINC is low. Controlling the capacitance of the input node 205 to the first capacitance value C1 in the preparatory selection period is useful for reducing the difference in voltage after resetting the input node 205 between the reset operation of the first pixel 101 and the reset operation of the second pixel 101. Thus, it becomes feasible to reduce the streak noises in each row.

An operation to be performed in the first mode is similar to the operation in the second mode except for an operation relating to the capacitance control unit 210. Corresponding operations are indicated in the "STATE" fields of FIGS. 7 and 8. Therefore, redundant description thereof will be avoided.

Similar to the first exemplary embodiment, in the first mode, the amplification transistor 207 outputs a pixel signal in the state where the capacitance of the input node 205 has been controlled to the first capacitance value C1. In other words, the amplification transistor 207 outputs a pixel signal in a state where the capacitance 211 is not connected to the input node 205. However, the imaging device performs the operation for resetting the input node 205 in the state where the capacitance 211 is connected to the input node 205. If there is an electric potential difference between the input node 205 and the capacitance 211, there will be a possibility of generating leak current flowing to the input node 205. Resetting the voltage of the input node 205 in the state where the capacitance 211 is connected to the input node 205 is useful for eliminating such a potential difference. As a result, the imaging device can reduce the noise caused by the leakage current.

In the present exemplary embodiment, the imaging device performs the reset operation for the input node 205 before starting the operation for reading the pixel signals from the pixels 101. The above-mentioned reset operation will be described in detail below with reference to the first pixels 101 of the pixel units 150 disposed in the N-th row and the (N+1)-th row. First, the control signal PFDINC becomes high at time t4. In this state, the control signal PRES is low. Accordingly, the imaging device switches the capacitance of the input node 205 from the first capacitance value C1 to the second capacitance value C2 in the state where the reset transistor 206 is off. Subsequently, the control signal PRES becomes high at time t5. In this state, the control signal PFDINC is high. Accordingly, the imaging device controls the reset transistor 206 from off to on in the state where the capacitance of the input node 205 is the second capacitance value C2. Through the above-mentioned processes, the imaging device completes the reset operation for the input node 205. Subsequently, the control signal PFDINC becomes low at time t8. The imaging device switches the capacitance of the input node 205 from the second capacitance value C2 to the first capacitance value C1. Subsequently, the control signal PRES becomes low at time t9. As a result, the imaging device releases the reset state. Subsequently, the imaging device output the pixel signals in the state where the capacitance of the input node 205 has been controlled to the first capacitance value C1.

As mentioned above, in the present exemplary embodiment, the reset transistor 206 turns on after the capacitance control unit 210 has switched the capacitance of the input node 205 from the first capacitance value C1 to the second capacitance value C2, which is greater than the first capacitance value C1. Performing the above-mentioned control is useful for reducing the variation in voltage of the input node 205 during the reset operation. This is because the capacitance of the input node 205 is large when the reset transistor 206 is operating and therefore the voltage variation caused by the coupling can be reduced.

If the voltage of the input node 205 greatly changes in the reset operation, there will be a possibility of failing in stabilizing the variation in voltage before starting the output operation. As a result, there will be a possibility of generating noises. Reducing variation in voltage of the input node 205 that may occur during the reset operation is useful for reducing the above-mentioned noises.

In the operations illustrated in FIGS. 7 and 8, the imaging device initially reads out pixel signals from the first pixels 101 (i.e., the pixels "R" illustrated in FIG. 5) of the pixel units 150 disposed in the N-th row and from the second pixels 101 (i.e., the pixels "G" illustrated in FIG. 5) of the pixel units 150 disposed in the (N+1)-th row. Next, the imaging device reads out pixel signals from the second pixels 101 (i.e., the pixels "G" illustrated in FIG. 5) of the pixel units 150 disposed in the N-th row and from the first pixels 101 (i.e., the pixels "R" illustrated in FIG. 5) of the pixel units 150 disposed in the (N+1)-th row. However, the order of reading out the pixel signals from the pixel units 150 is not limited to the above-mentioned example.

In a modified example, the imaging device initially reads out pixel signals from the first pixels 101 (i.e., the pixels "R" illustrated in FIG. 5) of the pixel units 150 disposed in the N-th row and from the first pixels 101 (i.e., the pixels "R" illustrated in FIG. 5) of the pixel units 150 disposed in the (N+1)-th row in parallel. Subsequently, the imaging device reads out pixel signals from the second pixels 101 (i.e., the pixels "G" illustrated in FIG. 5) of the pixel units 150 disposed in the N-th row and the second pixels 101 (i.e., the pixels "G" illustrated in FIG. 5) of the pixel units 150 disposed in the (N+1)-th row in parallel.

Further, in another modified example, the imaging device reads out pixel signals from the second pixels 101 of the pixel units 150 disposed in the N-th row and from the first pixels 101 of the pixel units 150 disposed in the (N+1)-th row in parallel. Next, the imaging device reads out pixel signals from the second pixels 101 of the pixel units 150 disposed in the (N+1)-th row and from the first pixels 101 of the pixel units 150 disposed in the (N+2)-th row in parallel. Subsequently, the imaging device reads out pixel signals from the second pixels 101 of the pixel units 150 disposed in the (N+2)-th row and from the first pixels 101 of the pixel units 150 disposed in the (N+3)-th row in parallel. As mentioned above, various reading orders are employable.

As mentioned above, in the present exemplary embodiment, the imaging device controls the reset transistor 206 from off to on after the capacitance control unit 210 completes the switching of the capacitance of the input node 205 from the first capacitance value C1 to the second capacitance value C2, which is greater than the first capacitance value C1. Employing the above-mentioned configuration is useful for reducing noises.

In particular, in the present exemplary embodiment, two pixels 101 commonly use one input node 205 and one amplification transistor 207. Therefore, the time interval from the reset operation performed after the reading of pixel signals from the first pixel 101 to the reading of pixel signals from the second pixels 101 is short, at one input node 205. Further, even in a case where the preparatory selection is performed, the time interval from the reset operation to the pixel signal reading operation is short. Therefore, remarkable noise reduction effects can be obtained by suppressing the variation in voltage of the input node 205, compared to the first exemplary embodiment.

Figure 9:
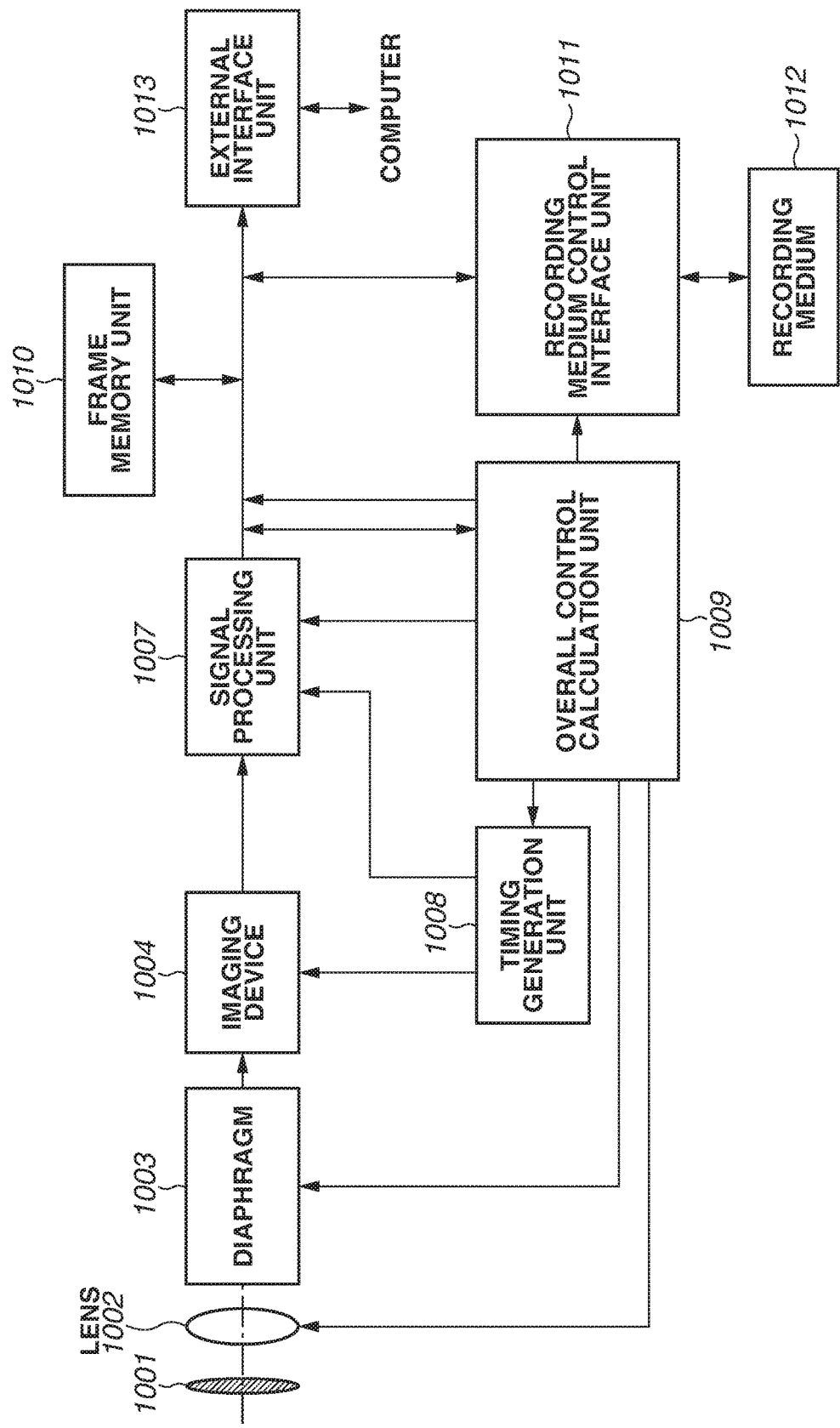
FIG. 9 is a block diagram illustrating an example of a photoelectric conversion system.

An imaging system according to a third exemplary embodiment of the disclosure will be described in detail below. A digital still camera, a digital camcorder, a camera head, a copying machine, a facsimile machine, a portable telephone, an on-vehicle camera, and an observation satellite are representative examples of the imaging system. FIG. 9 is a block diagram illustrating a digital still camera as an example of the imaging system.

The digital still camera illustrated in FIG. 9 includes a barrier 1001, a lens 1002, a diaphragm 1003, an imaging device 1004, a signal processing unit 1007, a timing generation unit 1008, an overall control calculation unit 1009, a frame memory unit 1010, a recording medium control interface unit 1011, a recording medium 1012, and an external interface unit 1013. The barrier 1001 protects the lens 1002. The lens 1002 forms an optical image of an imaging target object on the imaging device 1004. The diaphragm 1003 can change the quantity of light having passed through the lens 1002. The imaging device 1004 can convert an optical image formed by the lens 1002 into image data, as described in the above-mentioned exemplary embodiment. In the present exemplary embodiment, it is assumed that the imaging device 1004 includes an AD conversion unit formed on a semiconductor substrate thereof. The signal processing unit 1007 can perform various processing (including correction and data compression) on captured image data output from the imaging device 1004. In FIG. 9, the timing generation unit 1008 can output various timing signals to the imaging device 1004 and to the signal processing unit 1007. The overall control calculation unit 1009 can control various operations to be performed by the digital still camera. The frame memory unit 1010 temporarily stores the image data. The recording medium control interface unit 1011 can perform processing for recording or reading data into or from the recording medium 1012. The recording medium 1012 is a detachable medium, such as a semiconductor memory, to which the captured image data can be recorded or from which the stored image data can be read out. The external interface unit 1013 can communicate with an external computer. In the present exemplary embodiment, the timing signals may be input from a device provided outside the imaging system. The imaging system may be configured to include, at least, the imaging device 1004 and the signal processing unit 1007 that can process an image-capturing signal output from the imaging device 1004.

In the present exemplary embodiment, the imaging device 1004 and the AD conversion unit are provided on different semiconductor substrates. Alternatively, the imaging device 1004 and the AD conversion unit can be formed on the same semiconductor substrate. As a modified example, the imaging device 1004 and the signal processing unit 1007 may be formed on the same semiconductor substrate.

Further, each pixel 101 may be modified in such a way as to include a first photoelectric conversion unit 101A and a second photoelectric conversion unit 101B. The signal processing unit 1007 may be configured to process a signal derived from electric charge generated by the first photoelectric conversion unit 101A and a signal derived from electric charge generated by the second photoelectric conversion unit 101B, and acquire information about the distance from the imaging device 1004 to an imaging target object.

In the above-mentioned imaging system, any one of the imaging devices described in the first and second exemplary embodiments can be used as the imaging device 1004. Employing the above-mentioned configuration is useful for acquiring an image that includes a lesser amount of noise component.

Figure 10A:
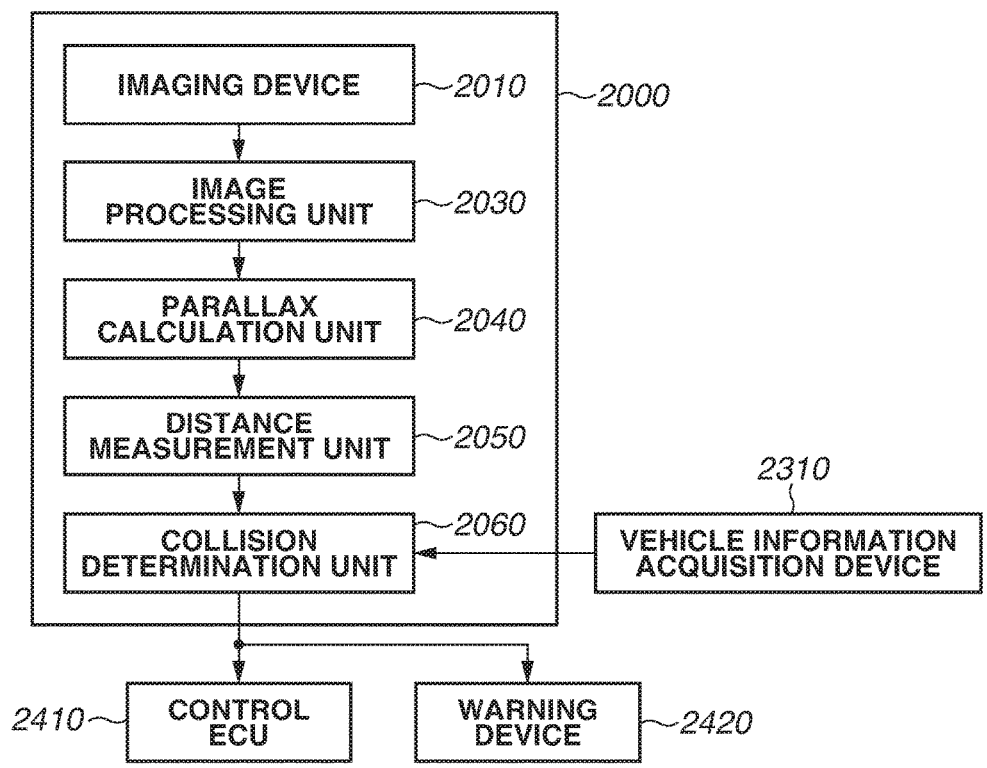
FIGS. 10A and 10B are block diagrams illustrating an example of a mobile object.
Figure 10B:
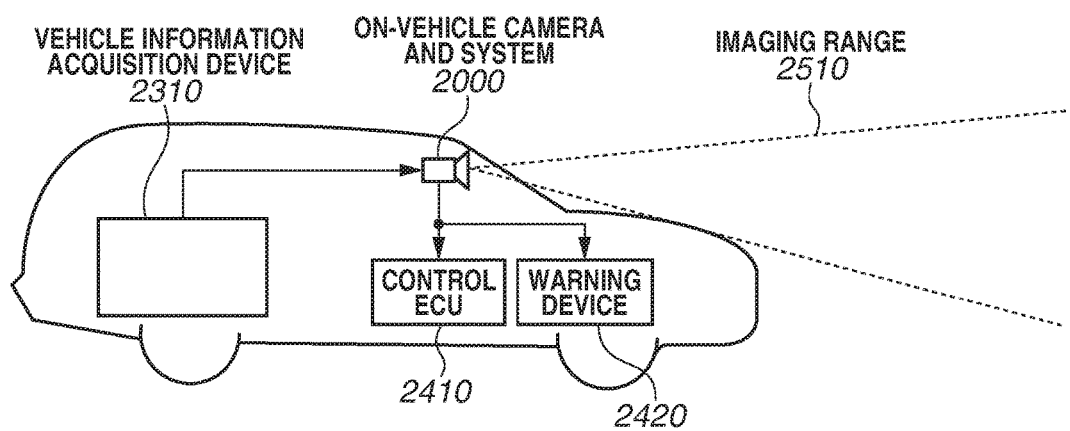

FIGS. 10A and 10B illustrate an imaging system 2000, which is an example of the imaging system relating to an on-vehicle camera. The imaging system 2000 includes an imaging device 2010 according to the above-mentioned exemplary embodiment. The imaging system 2000 further includes an image processing unit 2030 configured to perform image processing on a plurality of image data acquired by the imaging device 2010, and a parallax calculation unit 2040 configured to calculate a parallax (i.e., a phase difference between parallax images) based on the plurality of image data acquired by the imaging system 2000. Further, the imaging system 2000 includes a distance measurement unit 2050 configured to calculate the distance from a target object based on the calculated parallax, and a collision determination unit 2060 configured to determine whether there is a possibility of any collision based on the calculated distance. In the present exemplary embodiment, the parallax calculation unit 2040 and the distance measurement unit 2050 are examples of a distance information acquisition unit configured to acquire information about the distance from the target object. More specifically, the distance information is information relating to parallax, defocus amount, or distance from the target object. The collision determination unit 2060 may be configured to determine the possibility of collision by referring to the above-mentioned distance information. The distance information acquisition unit may be realized by a specially designed hardware or may be realized by a software module. Further, a field programmable gate array (FPGA) or an application specific integrated circuit (ASIC) is employable to realize the distance information acquisition unit. It is feasible to combine the above-mentioned devices appropriately.

The imaging system 2000 is connected to a vehicle information acquisition device 2310 that can acquire vehicle information (e.g., vehicle speed, yaw rate, and steering angle). Further, the imaging system 2000 is connected to a control ECU 2410 (i.e., a control apparatus) that can output a control signal, according to which the vehicle generates a braking force, based on a determination result obtained by the collision determination unit 2060. Further, the imaging system 2000 is connected to a warning device 2420 that can generate warning to a driver based on a determination result obtained by the collision determination unit 2060. For example, if the determination result obtained by the collision determination unit 2060 indicates a higher possibility of collision, the control ECU 2410 controls the vehicle to apply the braking force, reduce the acceleration, or decrease the engine output in such a way as to avoid the collision or reduce the damage. For example, the warning device 2420 can generate warning sounds or display a warning message on a screen if a car navigation system is installed, or can cause a safety belt or a steering wheel to vibrate, to inform a user of coming danger.

In the present exemplary embodiment, the imaging system 2000 can capture an image of the surrounding (e.g., front side or back side) of the vehicle. FIG. 10B illustrates an imaging system configured to capture an image of the front side of a vehicle. Although the imaging system according to the above-mentioned exemplary embodiment is configured to prevent the vehicle from colliding with other vehicle, the disclosure is also applicable to an automatic driving control that can drive the vehicle to chase other vehicle while keeping a safe distance or can guide the vehicle to travel along determined traffic lanes. Further, the application of the imaging system is not limited to vehicles. For example, the above-mentioned imaging system is applicable to a marine vessel, an aircraft, an industrial robot, or any other mobile object (or mobile apparatus). In addition, the above-mentioned imaging system is applicable to an intelligent transport system (ITS) or any other object recognition based device.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-072990, filed Mar. 31, 2016, which is hereby incorporated by reference herein in its entirety.

What is claimed is:

1. A driving method of an imaging device having a plurality of pixel units, each of the plurality of pixel units comprising:
    an output portion including an input node to receive electric charge generated through photoelectric conversion and being configured to output a signal based on a voltage of the input node;
    a reset portion controlled to turn on or off and configured to reset a voltage of the input node in an on state; and
    a control portion including a gate electrode configured to receive a control signal and being configured to control a capacitance of the input node to a first capacitance value and a second capacitance value, which is greater than the first capacitance value, according to the control signal, the driving method comprising:
       switching the capacitance of the input node from the second capacitance value to the first capacitance value by the control portion in a state where the reset portion is on;
       controlling the reset portion from on to off in the state where the capacitance of the input node is maintained at the first capacitance value;

outputting the signal in the state where the capacitance of the input node is the first capacitance value;
switching the capacitance of the input node from the first capacitance value to the second capacitance value by the control portion; and
controlling the reset portion from off to on,
wherein no signal is output during a period from a time when the capacitance of the input node is first changed from the first capacitance value to the second capacitance value after the signal is output in the state where the capacitance of the input node is the first capacitance value to a time when the capacitance of the input node is changed from the second capacitance value to the first capacitance value.

2. The driving method according to claim 1, further comprising:
outputting the signal from the output portion in the state where the capacitance of the input node is the second capacitance value after controlling the reset portion from off to on in the state where the capacitance of the input node has been controlled to the second capacitance value,
wherein, the capacitance of the input node is maintained at the second capacitance value in a period from the controlling the reset portion from off to on in the state where the capacitance of the input node has been controlled to the second capacitance value to the outputting the signal from the output portion, in the state where the capacitance of the input node is second capacitance value.

3. The driving method according to claim 1, each of the plurality of pixel units further comprising a transfer portion configured to transfer the electric charge to the input node,
wherein the outputting the signal from the output portion in the state where the capacitance of the input node is the first capacitance value includes:
outputting a first signal from the output portion before the electric charge is transferred, and
outputting a second signal from the output portion after the electric charge has been transferred.

4. The driving method according to claim 1, each of the plurality of pixel units further comprising a plurality of photoelectric conversion portions,
wherein the input node receives electric charge generated by each of the plurality of photoelectric conversion portions.

5. The driving method according to claim 4, wherein the plurality of photoelectric conversion portions is disposed under a single micro-lens.

6. The driving method according to claim 5, wherein electric charges generated by the plurality of photoelectric conversion portions are added at the input node.

7. The driving method according to claim 4, wherein the plurality of photoelectric conversion portions is disposed under mutually different micro-lenses.

8. The driving method according to claim 1, wherein the plurality of pixel units is disposed in such a way as to constitute a plurality of columns and a plurality of output lines is disposed for one of the plurality of columns.

9. The driving method according to claim 8, wherein the plurality of output line includes, at least, a first output line and a second output line, and each of the plurality of pixel units includes a first selection transistor configured to connect the output portion to the first output line and a second selection transistor configured to connect the output portion to the second output line.

10. The driving method according to claim 8, further comprising a plurality of column circuits corresponding to the output lines, wherein the plurality of pixel units is disposed between the plurality of column circuits.

11. The driving method according to claim 1, further comprising:
a first conductive type floating diffusion region that constitutes the input node; and
a second conductive type semiconductor region that is disposed adjacently to the floating diffusion region,
wherein the gate electrode is disposed on the semiconductor region via an insulating film.

12. The driving method of the imaging device according to claim 1, the capacitance includes a capacitance component PN junction.

13. The driving method of the imaging device according to claim 12, the reset portion, the input node, and the gate electrode of the control portion are arranged in this order.

14. The driving method according to claim 1,
wherein the output portion is disposed between the reset portion and the control portion.

15. The driving method according to claim 14,
wherein the step of switching the capacitance of the input node from the first capacitance value to the second capacitance value by the control portion is performed in a state where the reset portion is off, and
wherein the step of controlling the reset portion from off to on is performed in the state where the capacitance of the input node is maintained at the second capacitance value.

16. The driving method according to claim 15, each of the plurality of pixel units further comprising a plurality of a first photoelectric conversion portion and a second photoelectric conversion portion,
wherein the input node receives electric charge generated by each of the first photoelectric conversion portion and the second photoelectric conversion portion.

17. A driving method of an imaging device having a plurality of pixel units, each of the plurality of pixel units comprising:
an output portion including an input node to receive electric charge generated through photoelectric conversion and being configured to output a signal based on a voltage of the input node;
a transfer portion configured to transfer the electric charge to the input node;
a reset portion configured to be controlled to turn on or off and to reset the voltage of the input node in an on state; and
a transistor connected to the input node and having a gate electrode configured to receive a control signal, the driving method comprising, in a following order:
switching the transistor from on to off in a state where the reset portion is on,
controlling the reset portion from on to off in a state where the off state of the transistor is maintained,
outputting the signal from the output portion in a state where the transistor is off,
switching the transistor from off to on, and
controlling the reset portion from off to on,
wherein no signal is output during a period from a time when the transistor is first switched from off to on after the signal is output in the state where the transistor is off to a time when the transistor is switched from on to off.

18. The driving method according to claim 17, further comprising outputting the signal from the output portion in a state where the transistor is on.

19. The driving method according to claim 18,
wherein the step of switching the transistor from off to on is performed in a state where the reset portion is off, and
wherein the step of controlling the reset portion from off to on is performed in a state where the on state of the transistor is maintained.

* * * * *